(12) United States Patent
Lee

(10) Patent No.: US 12,369,097 B2
(45) Date of Patent: Jul. 22, 2025

(54) ARTIFICIAL INTELLIGENCE-BASED DATA TRANSMISSION DEVICE FOR IMPROVING SECURITY USING MULTIPLE NODES AND METHOD THEREOF

(71) Applicant: Game Crew Creative Inc., Incheon (KR)

(72) Inventor: Sangho Lee, Incheon (KR)

(73) Assignee: Game Crew Creative Inc., Incheon (KR)

( * ) Notice: Subject to any disclaimer, the term of this patent is extended or adjusted under 35 U.S.C. 154(b) by 449 days.

(21) Appl. No.: 18/049,449

(22) Filed: Oct. 25, 2022

(65) Prior Publication Data

US 2024/0137835 A1 Apr. 25, 2024
US 2024/0236809 A9 Jul. 11, 2024

(51) Int. Cl.
*G06F 13/00* (2006.01)
*H04W 40/22* (2009.01)
*H04W 84/18* (2009.01)

(52) U.S. Cl.
CPC ........... *H04W 40/22* (2013.01); *H04W 84/18* (2013.01)

(58) Field of Classification Search
CPC .... H04W 40/22; H04W 84/18; H04L 63/083; H04L 63/0861; H04L 63/0428; H04L 9/40

USPC ............ 709/201, 203; 726/6, 5, 3; 713/153, 713/150; 706/10

See application file for complete search history.

(56) References Cited

U.S. PATENT DOCUMENTS

| | | | |
|---|---|---|---|
| 11,443,380 B2 * | 9/2022 | Cummings | G06Q 40/12 |
| 11,468,531 B1 * | 10/2022 | Sastry | G06Q 20/065 |
| 11,823,089 B2 * | 11/2023 | Gunther | H04L 9/3239 |
| 2021/0264520 A1 * | 8/2021 | Cummings | G06Q 40/12 |
| 2023/0045774 A9 * | 2/2023 | Gunther | G06Q 50/18 |
| 2023/0247018 A1 * | 8/2023 | Dutt | H04L 63/0861 |
| | | | 713/153 |

FOREIGN PATENT DOCUMENTS

KR 10-2008-0026461 A 3/2008

* cited by examiner

*Primary Examiner* — Kenneth R Coulter
(74) *Attorney, Agent, or Firm* — Studebaker Brackett PLLC

(57) ABSTRACT

The inventive concept relates to an AI-based data transmission method for improving security by using a plurality of nodes. The inventive concept selects a plurality of nodes for request and response communication between a client device and a target server as relay nodes, and communicates between the client device and the target server by using the relay nodes.

8 Claims, 13 Drawing Sheets

ARTIFICIAL INTELLIGENCE-BASED DATA TRANSMISSION DEVICE FOR IMPROVING SECURITY USING MULTIPLE NODES AND METHOD THEREOF

BACKGROUND

Embodiments of the inventive concept described herein relate to a data transmission device.

When a request from a client device to a server is detected, the request is transmitted from the client device to the server, and a response to the request is transmitted from the server to the client.

Although the above data transmission method is commonly used, this method has the problem of significantly reducing security because it is not difficult to browse data transmission detais.

There is a need for a technology that can solve the above security problem while maintaining data transmission and reception between client devices and servers, but this technology is not developed yet.

SUMMARY

Embodiments of the inventive concept provide an artificial intelligence (AI)-based data transmission method for improving security by using a plurality of nodes.

Moreover, the inventive concept may select a plurality of nodes for request and response communication between a client device and a target server as relay nodes, and may communicate between the client device and the target server by using the relay nodes.

Problems to be solved by the inventive concept are not limited to the problems mentioned above, and other problems not mentioned will be clearly understood by those skilled in the art from the following description.

According to an embodiment, a blockchain-based data transmission method performed by a data transmission device includes detecting a request for a specific server from a client device, selecting two or more nodes, via which the client device delivers the request to the specific server, as a request relay node, selecting two or more nodes, via which the specific server delivers a response to the request to the client device, as a response relay node, delivering a request of the client device to the specific server via the selected request relay node, and delivering the response of the specific server to the request to the client device via the selected response relay node.

Moreover, each node acting as the request relay node and the response relay node may belong to a group classified for each predetermined category.

Furthermore, the selecting of the two or more nodes as the request relay node may include selecting a first node from a group different from a group to which the client device belongs, and selecting nodes, which are adjacent to each other, such that the adjacent nodes do not belong to the same group when two or more nodes are selected. The selecting of the two or more nodes as the response relay node may include selecting a first node from a group different from a group to which the specific server belongs, and selecting nodes, which are adjacent to each other, such that the adjacent nodes do not belong to the same group when two or more nodes are selected.

Also, while selecting the two or more nodes as the request relay node and selecting the two or more nodes as the response relay node, when the data transmission device selects nodes adjacent to each other, the data transmission device may select a next node from a group where data transmission between the adjacent nodes is possible but data sharing between the adjacent nodes is not possible.

Besides, a table for recording a trace linkage between countries may be stored in the data transmission device. When the data transmission device selects a specific node belonging to a specific country as a first node when the data transmission device selects nodes adjacent to each other, the data transmission device may select a second node, which is a next node of the first node, within a group that is not linked with the specific country.

In addition, the delivering of the request of the client device may include providing, by the client device, a predetermined coin to each node of the request relay node in return for forwarding the request to the specific server via the relay node. The delivering of the response of the specific server may include providing, by the specific server, a predetermined coin to each node of the response relay node in return for forwarding the request to the client device via the relay node.

Moreover, the client device may operate as the data transmission device. The data transmission device may store at least one of the request relay node selection result, the response relay node result, the request transmission result, and the response transmission result on a blockchain. At least one of group classification information, a contract address, and a public key of each node acting as the relay node may be stored.

Furthermore, the data transmission device may determine the number of nodes to be included in the request relay node and the response relay node based on artificial intelligence, and may select nodes, of which the number corresponds to the determined number of nodes, from a plurality of nodes, each of which acts as relay node.

According to an embodiment, a blockchain-based data transmission device detects a request for a specific server from a client device, selects two or more nodes, via which the client device delivers the request to the specific server, as request relay node, selects two or more nodes, via which the specific server delivers a response to the request to the client device, as response relay node, delivers a request of the client device to the specific server via the selected request relay node, and to deliver the response of the specific server to the request to the client device via the selected response relay node.

In addition, another method and another system for implementing the inventive concept, and a computer-readable recording medium for recording a computer program for performing the method may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
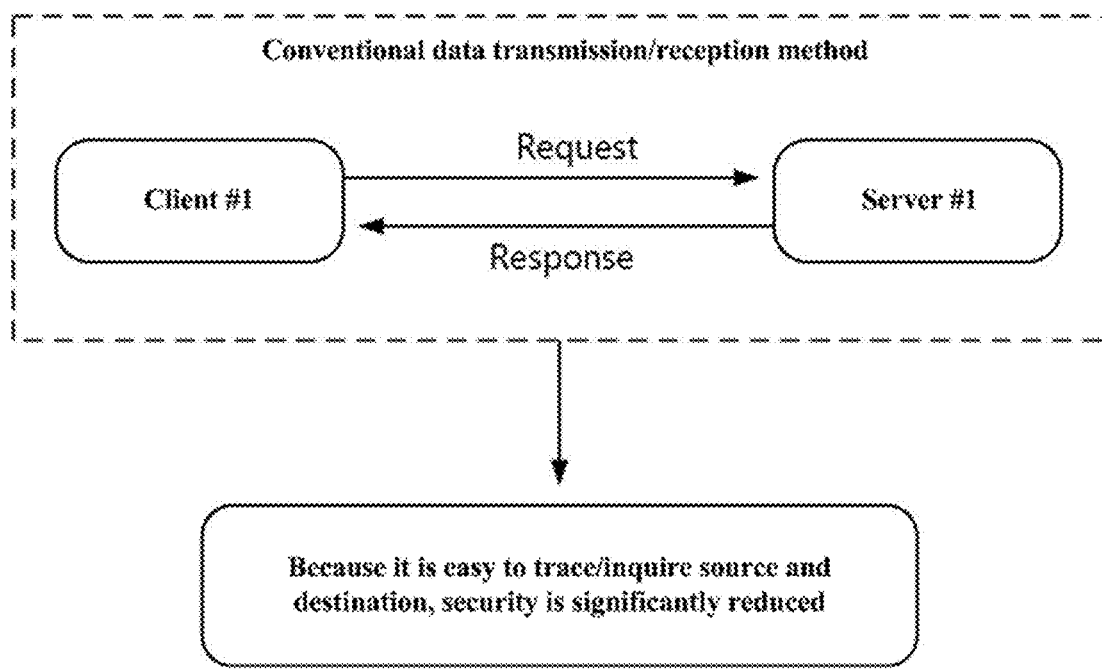
FIG. 1 is a diagram illustrating a conventional data transmission/reception method.

The above and other aspects, features and advantages of the inventive concept will become apparent from embodiments to be described in detail in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the scope of the inventive concept to those skilled in the art. The inventive concept may be defined by the scope of the claims.

The terms used herein are provided to describe embodiments, not intended to limit the inventive concept. In the specification, the singular forms include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" includes each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Prior to describing the inventive concept, problems of the prior art will be briefly described.

FIG. 1 is a diagram illustrating a conventional data transmission/reception method.

Referring to FIG. 1, when a request is transmitted from a client device 300 to a target server 400, a server device transmits a response to the client device 300 at the request of a client.

Because it is easy to inquire a location where data is requested and a location where a response to the request is made, the security of this data transmission method is significantly reduced.

Accordingly, the present applicant has devised the inventive concept to solve these issues.

Hereinafter, an embodiment of the inventive concept will be described in detail with reference to the accompanying drawings.

Figure 2:
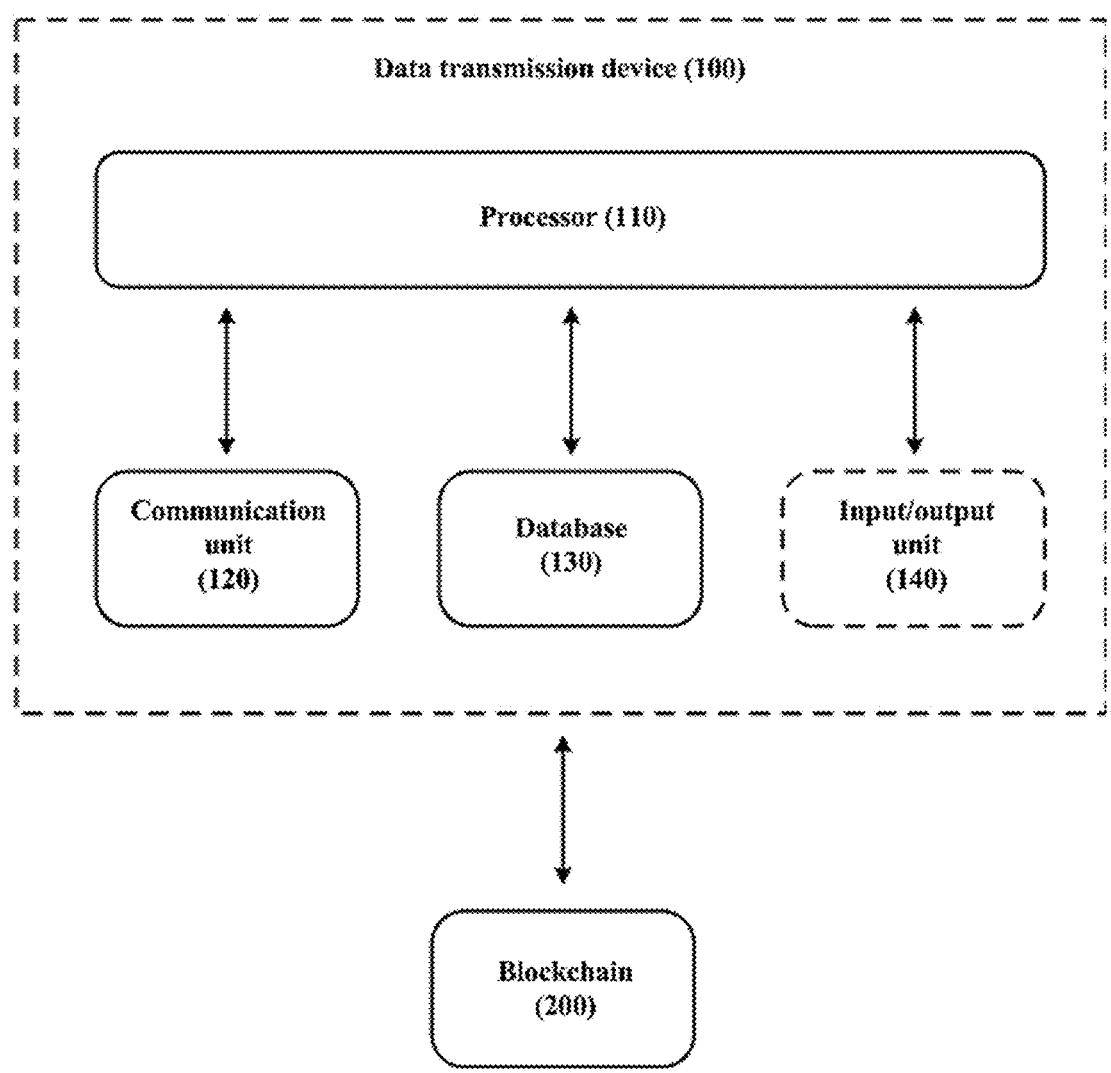
FIG. 2 is a block diagram of a data transmission device, according to an embodiment of the inventive concept.

FIG. 2 is a block diagram of a data transmission device 100, according to an embodiment of the inventive concept.

A communication unit 120 may communicate with an external device. In detail, the communication unit 120 may communicate with at least another node, at least another server device, and the like.

A database 130 may be a storage means and may store various commands, algorithms or AI models for executing an AI-based data transmission method for improving security by using a plurality of nodes.

In an embodiment, the database 130 stores group information of each node that acts as a relay node.

The data transmission device 100 groups nodes, each of which acts as a relay node, such that the nodes belong to a group classified for each predetermined category and stores the grouped result in the database 130.

In this case, only data transmission between nodes between different groups may be possible, but data sharing between nodes between different groups may be impossible.

In an embodiment, the database 130 stores a table in which trace linkages between countries are recorded.

The features according to an embodiment of the inventive concept using the above group classification are described in more detail below.

In an embodiment, the data transmission device 100 may store basic information in the database 130 itself and may store and manage various pieces of data requiring anonymity by using a blockchain 200.

In an embodiment, the data transmission device 100 may store at least one of a request relay node selection result, a response relay node result, a request transmission result, and a response transmission result on a blockchain.

A processor 110 may include at least one core, may be responsible for controlling components in the data transmission device 100, and may execute an AI-based data transmission method for improving security by using a plurality of nodes, by using commands, algorithms, and artificial intelligence models stored in the database 130.

However, in some embodiments, the data transmission device 100 may include fewer or more components than the components illustrated in FIG. 2.

As illustrated in FIG. 2, the data transmission device 100 may further include an input/output unit 140.

This input/output unit 140 is a configuration for making a request for information to the target server 400 and for displaying a response received from the target server 400 depending on an information request.

In some embodiments, an input unit for making a request for information to the target server 400 and an output unit for displaying a response received from the target server 400 depending on the information request may be implemented separately.

Also, the data transmission device 100 according to an embodiment of the inventive concept may include a server device, and may operate as a data transmission server.

Hereinafter, an AI-based data transmission method for improving security by using a plurality of nodes will be described in detail with reference to FIGS. 3 to 10.

According to an embodiment of the inventive concept, a data transmission system 10, the data transmission device 100, a data transmission method, and the data transmission program may operate based on at least one of artificial intelligence, multiple networks, and a blockchain.

Figure 3:
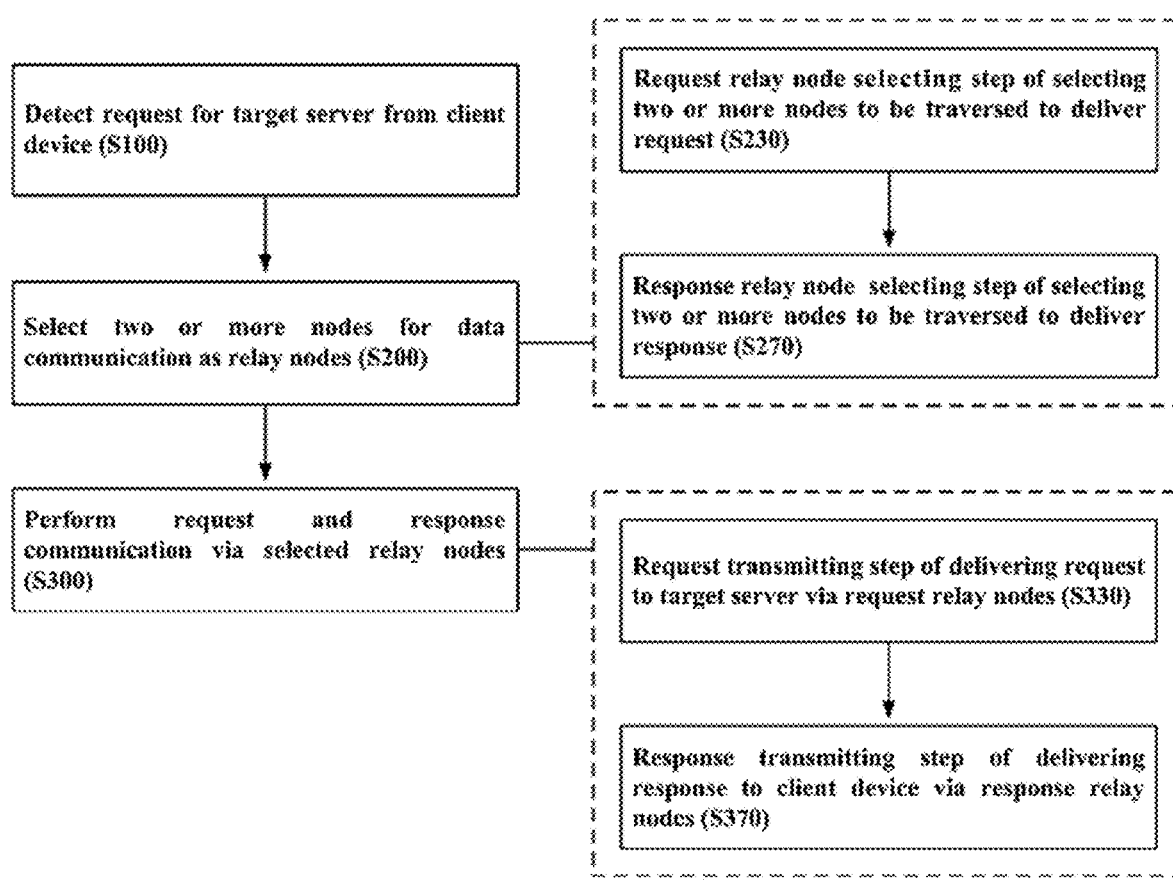
FIG. 3 is a flowchart of a data transmission method, according to an embodiment of the inventive concept.

FIG. 3 is a flowchart of a data transmission method, according to an embodiment of the inventive concept.

Figure 4:
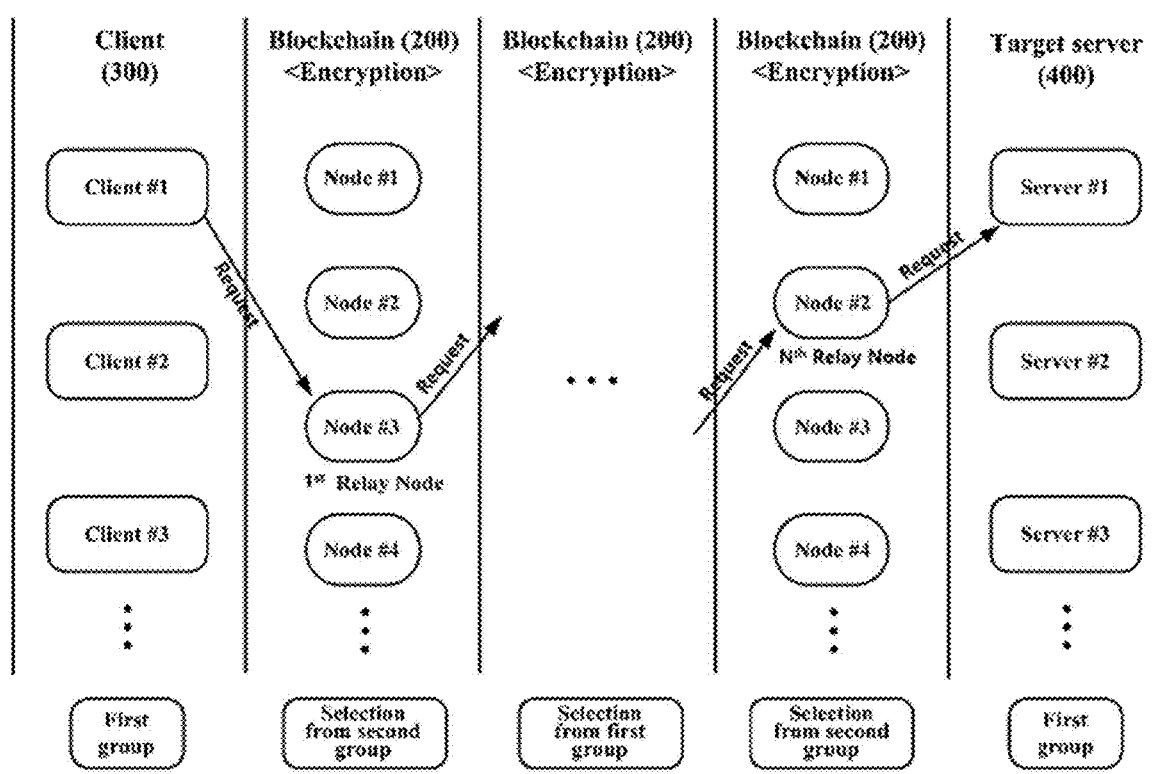
FIG. 4 is a diagram illustrating a request process using a data transmission method, according to an embodiment of the inventive concept.

FIG. 4 is a diagram illustrating a request process using a data transmission method, according to an embodiment of the inventive concept.

Figure 5:
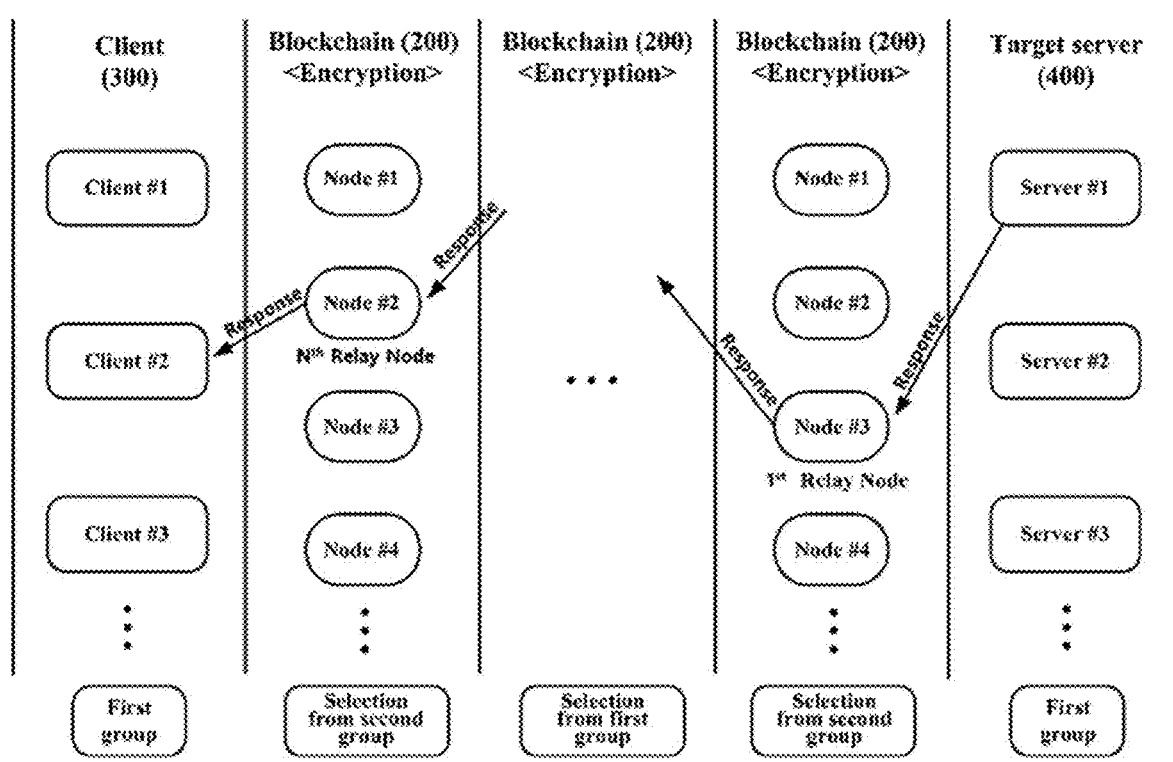
FIG. 5 is a diagram illustrating a response process using a data transmission method, according to an embodiment of the inventive concept.
Figure 6:
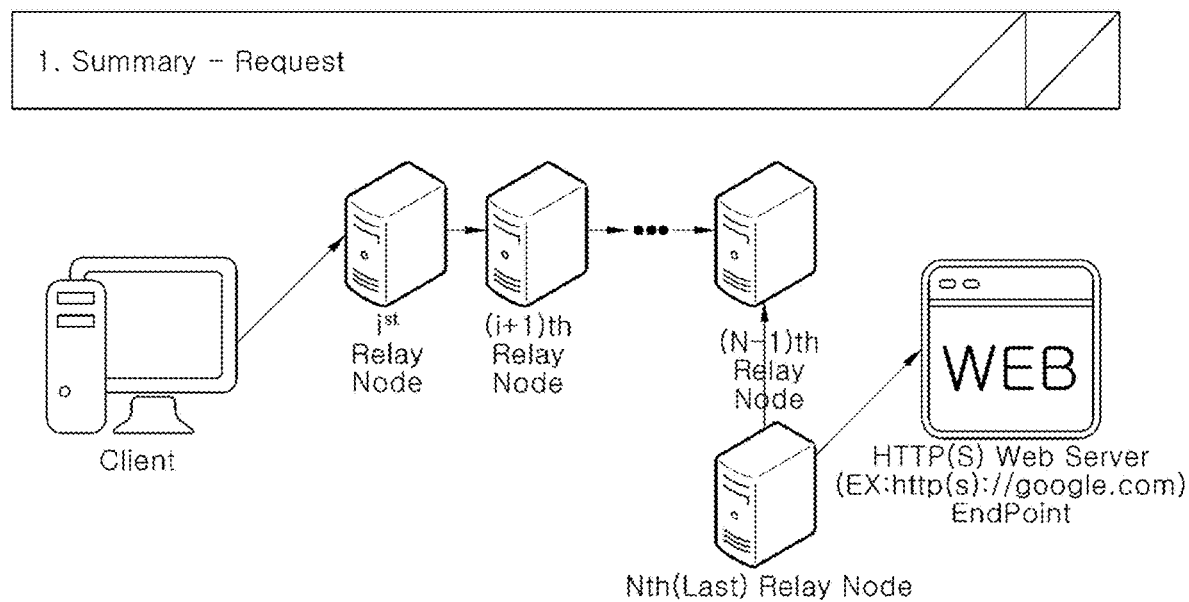
FIGS. 6 to 9 are diagrams illustrating a request process.
Figure 7:
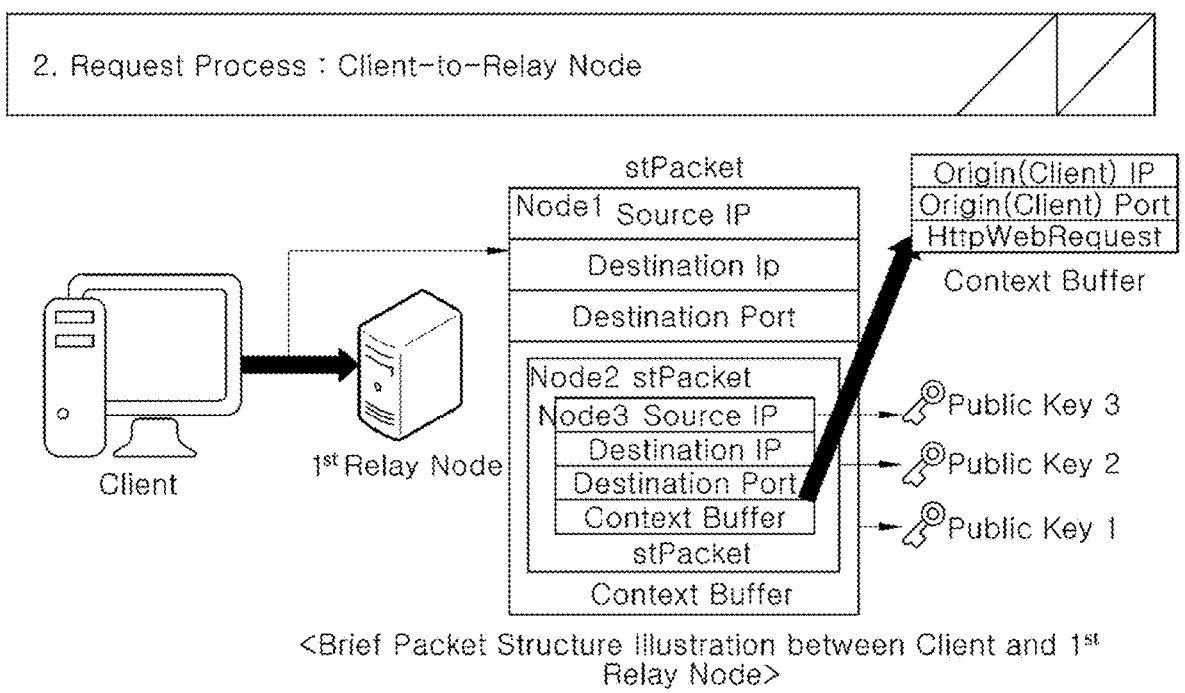
Figure 8:
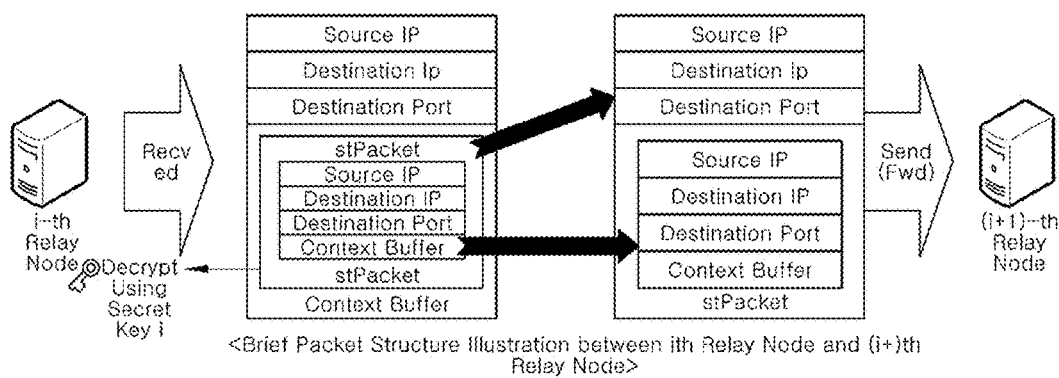
Figure 9:
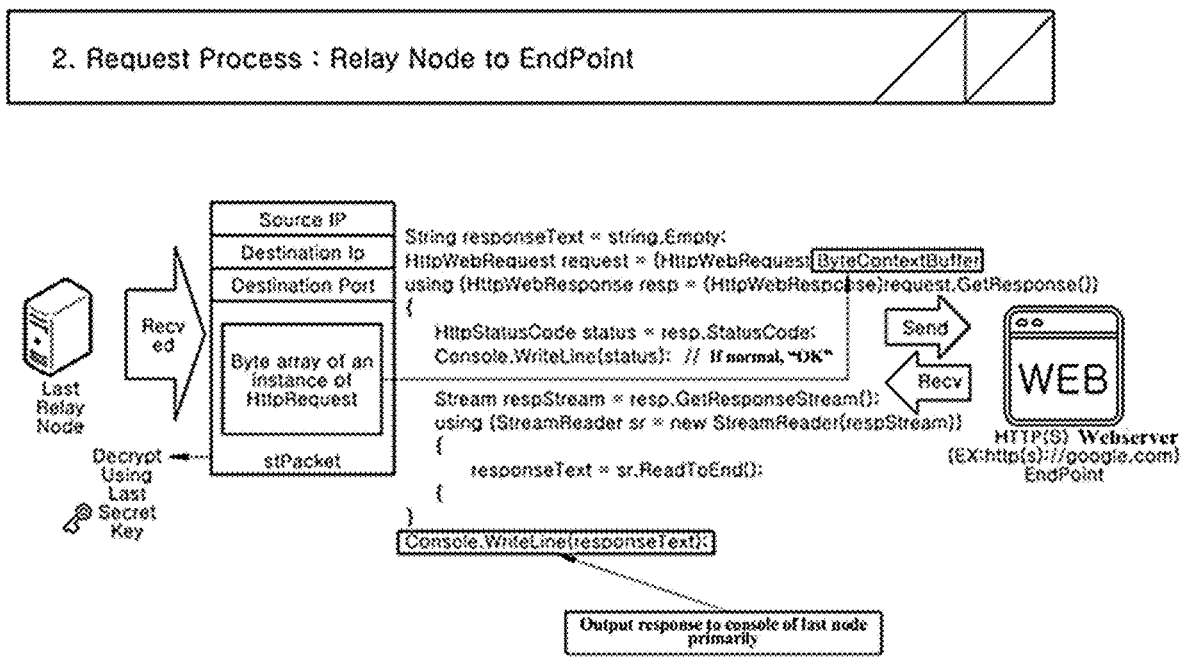
Figure 10:
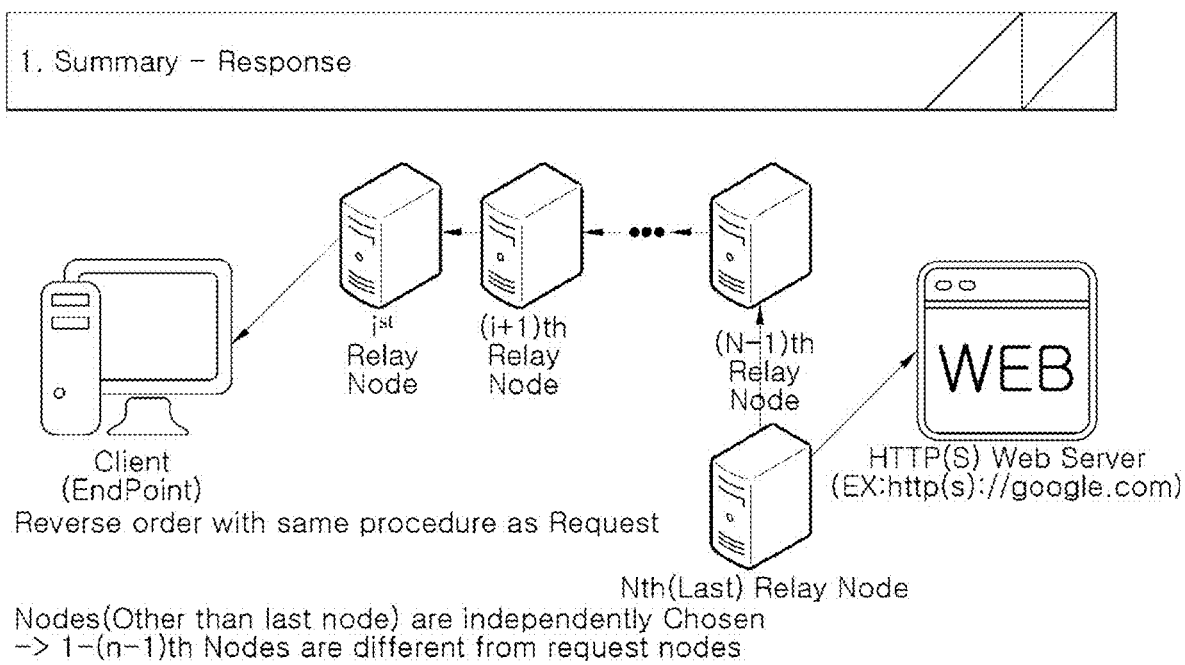
FIGS. 10 to 13 are diagrams illustrating a response process.
Figure 11:
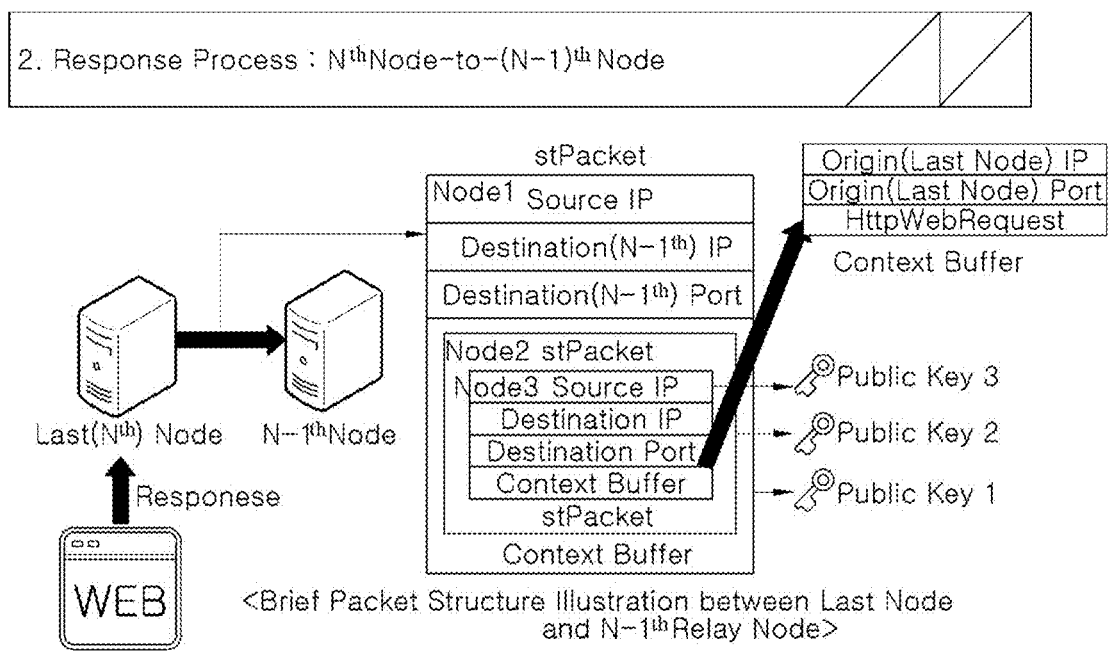
Figure 12:
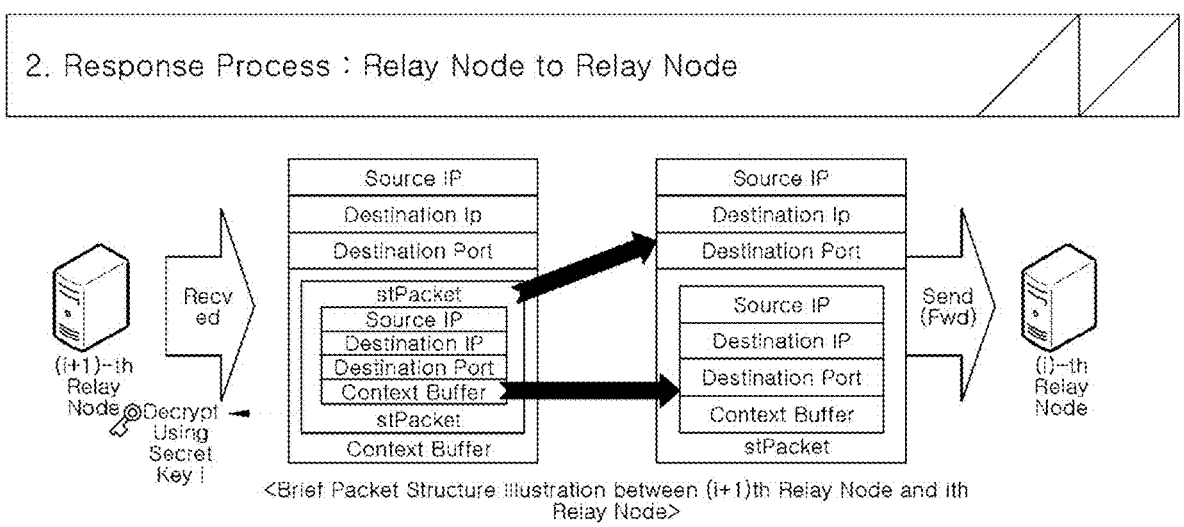
Figure 13:
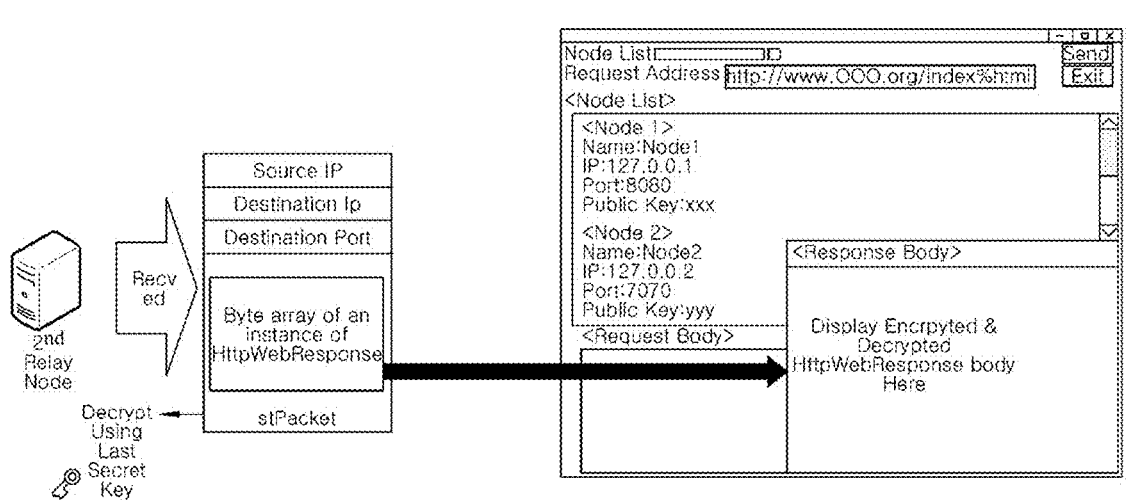

FIG. 5 is a diagram illustrating a response process using a data transmission method, according to an embodiment of the inventive concept.

FIGS. 6 to 9 are diagrams illustrating a request process.

FIGS. 10 to 13 are diagrams illustrating a response process.

The processor 110 of the data transmission device 100 detects a request for the target server 400 (a specific server) from the client device 300 (S100).

The processor 110 selects at least two or more nodes, via which the request is delivered from the client device 300 to the target server 400, as relay nodes (S200).

The processor 110 performs request and response communication between the client device 300 and the target server 400 via the relay nodes selected in S200 (S300).

The relay node selecting step may include the following two steps.

The processor 110 selects two or more nodes, via which the request is delivered from the client device 300 to the target server, as request relay nodes (S230).

The processor 110 selects two or more nodes, via which a response is delivered from the target server to the client device 300, as response relay nodes (S270).

According to an embodiment of the inventive concept, it is described that two or more nodes are selected when a request relay node and a response relay node are selected, but an embodiment is not limited thereto. For example, selecting one or more nodes may also be applied thereto.

The request and response communication executing step may include the following two steps.

The request of the client device 300 is delivered to the target server 400 via the relay nodes selected in S200 (request transmitting step S330).

The response of the target server 400 according to the request of the client device 300 is delivered to the client device 300 via the relay nodes selected in S200 (response transmitting step S370).

Referring to FIGS. 4 and 5, it is described that the request is transmitted from the client device 300 to the target server 400 through the relay nodes selected in S200, and the response is transmitted from the target server 400 to the client device 300 through the relay nodes.

For example, a data transmission system 10 transmits a request from the client device 300 to the target server 400 through nodes from node #3 to node #2, when a total of 4 relay nodes such as node #3, node #2, node #1, node #4, and node #2 are selected.

Moreover, the data transmission system 10 transmits a response from the target server 400 to the client device 300 through nodes from node #3 to node #2.

At this time, when the relay node is selected in S200, the data transmission device 100 may provide, in advance, a notification that the request will be transmitted to each selected node.

Accordingly, when the relay node is selected in S200, the data transmission device 100 may determine, in advance, a relay order in addition to selecting a plurality of nodes as relay nodes.

In an embodiment, in S200, the data transmission system 10 may differently select a node to be traversed in the request transmitting step and a node to be traversed in the response transmitting step.

In an embodiment, the data transmission system 10 may select a response relay node by selecting at least one node among the request relay nodes as another node.

In an embodiment, the data transmission system 10 may select a path, which is completely different from a request path and a response path, by selecting all nodes within the request relay nodes as other nodes and selecting a response relay node.

In detail, the data transmission device 100 may determine the number of nodes, which are to be used as relay nodes in the request transmitting step, based on artificial intelligence and may select nodes, of which the number is the determined number of nodes, as request relay nodes.

Furthermore, the data transmission device 100 may determine the number of nodes, which are to be used as relay nodes in the response transmitting step, based on artificial intelligence and may select nodes, of which the number is the determined number of nodes, as response relay nodes.

That is, the data transmission device 100 may differentiate the number of nodes as well as a path of the request relay node and a path of the response relay node and may select a path.

According to an embodiment of the inventive concept, the data transmission system 10 may select the route of S330 and the route of S370 differently. This is reason that the data transmission system 10 uses an artificial intelligence model, thereby easily selecting the route depending on each situation.

Each of these situations may be determined depending on a security level. The data transmission device 100 may determine this security level by using various conditions such as a security status, a location, and a country of each of the client device 300 and the target server 400.

For example, when a higher security level is required, the data transmission device 100 may select a larger number of nodes as relay nodes.

The AI model used in an embodiment of the inventive concept may learn how to create a request path or response path capable of maximally guaranteeing security and anonymity, based on information of the client device 300 and the target server 400.

Accordingly, when the processor 110 requests the AI model to create the request path and the response path, the AI model may inquire the information of the client device 300 and the information of the target server 400 and may determine the number of nodes to be selected as relay nodes, or a path to be selected, based on the inquired result.

Besides, to solve issues of delay caused by using a relay node to ensure and enhance security, the AI model may generate the optimal number of relay nodes and the optimal relay node path.

In an embodiment, the processor 110 may check changes in nodes of each group at predetermined intervals. When the changes are present, the processor 110 may analyze detailed information of the changes and may reflect the analyzed result.

In the data transmission system 10, each node acting as a relay node is grouped into a group classified for each predetermined category.

In an embodiment, the data transmission device 100 may group each node acting as a relay node based on at least one predetermined group classification condition. A plurality of group classification conditions may be applied thereto.

In this case, the number of groups may be set to at least two groups. In the predetermined group classification condition, only data transmission between nodes between different groups is possible, but data sharing between nodes between different groups is impossible.

Furthermore, the political system and operating system of a country is described as the group classification condition.

However, whatever a method of enhancing security in data transmission and avoiding tracking is, the method may be applied thereto.

The data transmission device 100 selects a first node in a group different from a group, to which the client device 300 belongs, in the request relay node selecting step, and selects a request relay node such that adjacent nodes do not belong to the same group.

Referring to FIG. 4, for example, when the client device 300 belongs to the first group, a first node is selected from the second group, a second node is selected from the first group, and a third node is selected from the second group (when there are 2 groups).

In this case, the data transmission device 100 may recognize a group of the target server 400 and may determine the number of request relay nodes and the number of response relay nodes based on the recognized group.

For example, as illustrated in FIG. 4, when the client device 300 and the target server 400 belong to the same group as each other, the data transmission device 100 may select the odd number of nodes.

On the other hand, when the client device 300 and the target server 400 belong to different groups from each other, the data transmission device 100 may select the even number of nodes.

The data transmission device 100 selects a first node in a group different from a group, to which the target server 400 belongs, in the response relay node selecting step, and selects a request relay node such that adjacent nodes do not belong to the same group.

Referring to FIG. 5, for example, when the target server 400 belongs to the first group, a first node is selected from the second group, a second node is selected from the first group, and a third node is selected from the second group (when there are 2 groups).

In other words, in the request relay node selecting step or the response relay node selecting step, the data transmission device 100 may select an N-th node from nodes belonging to a group different from a group, to which a (N−1)-th node belongs.

For example, when the data transmission device 100 selects a relay node in a method of selecting the first node from nodes in the first group, selecting the second node from nodes in the second group, and selecting the third node from nodes in the first group (See FIG. 4).

In the disclosed embodiment, the first group and the second group are described by way of example. However, when only the group classification condition is maintained, a larger number of groups may be included.

As described above, only data transmission between nodes between different groups may be possible, but data sharing between nodes between different groups may be impossible. Accordingly, when the data transmission system 10 is used, security may be guaranteed by preventing data leakage and avoiding data transmission tracking.

As described above, the database 130 stores a table in which trace linkages (linkage information) between countries are recorded.

In an embodiment, when the data transmission device 100 selects a specific node belonging to the first country in the N-th node in the relay node selecting step, the data transmission device 100 may select a node within a group, which is not linked with the first country, based on the table in the (N+1)-th node.

For example, the category and group classification information used in an embodiment of the inventive concept may be applied to a country's location, region, continent, and a national operating system such as socialism or democracy.

In detail, reasons such as the national political system and the national operating system 10 are capable of being applied to the linkage information between countries (e.g., liberal democracy, socialism, or the like).

For example, when the location of the client device 300 corresponds to the first country and the first country belongs to the second group, the data transmission device 100 may select one of nodes belonging to the second group as the next node (the first node) for transmitting a response from the client device 300, may select a response relay node in a method of selecting one of nodes belonging to the first group as the next node (the second node), and may transmit a response to the target server 400.

The data transmission system 10 according to an embodiment of the inventive concept may prevent data leakage and tracking while normally transmitting a request to the target server 400 and normally receiving a response from the server through these technical features.

In addition, as further described in detail below, each node acting as a relay node is provided with a coin based on the blockchain 200 rather than a general compensation method in exchange for data transmission, thereby further enhancing the security of preventing tracking of data transmission details.

The data transmission device 100 stores at least one of a request relay node selection result, a response relay node result, a request transmission result, and a response transmission result on the blockchain. At least one of group classification information, contract address, and public key of each node acting as a relay node is stored.

At this time, when the processor 110 fails to check changes, the processor 110 may try the check again.

In an embodiment, the data transmission system 10 may provide (pay) an activity fee to each node acting as a relay node.

In detail, in the request transmitting step S330, the data transmission system 10 may allow the client device 300 to provide a predetermined coin to each node of the relay node in return for delivering (transmitting) a request to the target server 400 via a relay node.

Besides, in the response transmitting step S370, the data transmission system 10 may allow the target server 400 to provide a predetermined coin to each node of the relay node in return for delivering (transmitting) a response to the client device 300 via a relay node.

At this time, it is described that the data transmission system 10 provides (pays) a coin in return for the activity of the relay node. However, the return for the activity is not necessarily limited to a coin.

In the data transmission system 10 according to an embodiment of the inventive concept, the client device 300 may operate as the data transmission device 100.

Referring to FIGS. 6 to 13, a method in which the data transmission device 100 generates a packet for data transmission between a node and a node is described by way of example.

In an embodiment, for data transmission between a node and a node, the processor 110 generates a packet by using a source IP (IP of the previous/previous node), a destination IP, a destination port, and a context buffer for each node.

Moreover, the processor 110 stores the packet generated for the next node of the corresponding node in the context buffer of each node.

Furthermore, the Context Buffer stores an origin (client) IP: an IP of the client device 300, an origin (client) port: a port of the client device 300, and HttpWebresponse.

Accordingly, the packet generated by the data transmission device 100 may encrypt and store at least one of the IP and port of the client device 300, the IP of the previous node, the IP and port of the next node, and the IP and port of the final destination (a target server or client device).

The processor 110 may decrypt the packet by using a public key and a private key.

At this time, the processor 110 may inquire the public key by accessing each node by using a contract address.

A specific web browser or a web browser created/provided as needed may be used to provide a data transmission method according to an embodiment of the inventive concept.

The data transmission method according to an embodiment of the inventive concept does not operate only on a web-based basis. The method may be applied to any field as long as it supports data communication between the client device 300 and a server.

Basically, in a conventional data transmission method, both the information and the location of each of the client device 300 and the target server 400 may be known from the outside. Accordingly, in the conventional method, the privacy of traffic is not guaranteed, which leads to poor security.

However, when the data transmission method according to an embodiment of the inventive concept as described above is used, the client device 300 and the target server 400 communicate by using a plurality of relay nodes, and the security may be significantly improved because the client device 300 and the target server 400 operate and manage data by using the blockchain 200.

As shown in FIGS. 4 and 5, each node acting as a relay node in the data transmission system 10 according to an embodiment of the inventive concept operates on the blockchain 200 and thus is encrypted, thereby improving security.

The method according to an embodiment of the inventive concept may be implemented by a program (or an application) and may be stored in a medium such that the program is executed in combination with a server being hardware.

According to an embodiment of the inventive concept, it is possible to provide an AI-based data transmission method for improving security by using a plurality of nodes.

Moreover, according to an embodiment of the inventive concept, it is possible to select a plurality of nodes for request and response communication between a client device and a target server as relay nodes, and to communicate between the client device and the target server by using the relay nodes.

The above-described program may include a code encoded by using a computer language such as C, C++, JAVA, a machine language, or the like, which a processor (CPU) of the computer may read through the device interface of the computer, such that the computer reads the program and performs the methods implemented with the program. The code may include a functional code related to a function that defines necessary functions executing the method, and the functions may include an execution procedure related control code necessary for the processor of the computer to execute the functions in its procedures. Furthermore, the code may further include a memory reference related code on which location (address) of an internal or external memory of the computer should be referenced by the media or additional information necessary for the processor of the computer to execute the functions. Further, when the processor of the computer is required to perform communication with another computer or a server in a remote site to allow the processor of the computer to execute the functions, the code may further include a communication related code on how the processor of the computer executes communication with another computer or the server or which information or medium should be transmitted/received during communication by using a communication module of the computer.

The stored medium refers not to a medium, such as a register, a cache, or a memory, which stores data for a short time but to a medium that stores data semi-permanently and is read by a device. Specifically, for example, the stored media include, but are not limited to, ROM, RAM, CD-ROM, magnetic tape, floppy disk, optical data storage device, and the like. That is, the program may be stored in various recording media on various servers, which the computer may access, or in various recording media on the computer of the user. Further, the media may be distributed in computer systems connected over a network such that codes readable by the computer are stored in a distributed manner.

Steps or operations of the method or algorithm described with regard to an embodiment of the inventive concept may be implemented directly in hardware, may be implemented with a software module executable by hardware, or may be implemented by a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or a computer-readable recording medium well known in the art to which the inventive concept pertains.

Although an embodiment of the inventive concept are described with reference to the accompanying drawings, it will be understood by those skilled in the art to which the inventive concept pertains that the inventive concept can be carried out in other detailed forms without changing the scope and spirit or the essential features of the inventive concept. Therefore, the embodiments described above are provided by way of example in all aspects, and should be construed not to be restrictive.

What is claimed is:

1. A blockchain-based data transmission method performed by a data transmission device, the method comprising:

detecting a request for a specific server from a client device;

selecting two or more first nodes, via which the client device delivers the request to the specific server, as a request relay node;

selecting two or more second nodes, via which the specific server delivers a response to the request to the client device, as a response relay node;

delivering the request of the client device to the specific server via the selected request relay node; and delivering the response of the specific server to the request to the client device via the selected response relay node, wherein each node acting as the request relay node and the response relay node belongs to a group classified for each predetermined category, and wherein the selecting of the two or more first nodes comprises:

selecting a first node from a group different from a group to which the client device belongs; and when the two or more first nodes are selected, selecting nodes, which are adjacent to each other, such that the adjacent nodes do not belong to the same group, and wherein the selecting of the two or more second nodes comprises:

selecting a second node from a group different from a group to which the specific server belongs; and when the two or more second nodes are selected, selecting nodes, which are adjacent to each other, such that the adjacent nodes do not belong to the same group.

2. The blockchain-based data transmission method of claim 1, wherein, while selecting the two or more first nodes as the request relay node and selecting the two or more second nodes as the response relay node when the data transmission device selects nodes adjacent to each other, the data transmission device selects a next node from a group where data transmission between the adjacent nodes is possible but data sharing between the adjacent nodes is not possible.

3. The blockchain-based data transmission method of claim 1, wherein a table for recording a trace linkage between countries is stored in the data transmission device, and wherein, when the data transmission device selects a specific node belonging to a specific country as a first node when the data transmission device selects nodes adjacent to each other, the data transmission device selects a second node, which is a next node of the first node, within a group that is not linked with the specific country.

4. The blockchain-based data transmission method of claim 1, wherein the delivering of the request of the client device includes:

providing, by the client device, a predetermined coin to each node of the request relay node in return for forwarding the request to the specific server via the request relay node, and wherein the delivering of the response of the specific server includes:

providing, by the specific server, a predetermined coin to each node of the response relay node in return for forwarding the request to the client device via the response relay node.

5. The blockchain-based data transmission method of claim 1, wherein the client device operates as the data transmission device, wherein the data transmission device stores at least one of the request relay node selection result, the response relay node selection result, the request transmission result, and the response transmission result on the blockchain-based data transmission, and wherein at least one of group classification information, a contract address, and a public key of each node acting as the request relay node or the response relay node is stored.

6. The blockchain-based data transmission method of claim 5, wherein the data transmission device determines the number of nodes to be included in the request relay node and the response relay node based on artificial intelligence, and selects nodes, of which the number corresponds to the determined number of nodes, from a plurality of nodes, each of which acts as the request relay node or the response relay node.

7. A non-transitory computer-readable recording medium storing a program combined with a computer being a piece of hardware to execute the blockchain-based data transmission method of claim 1.

8. A blockchain-based data transmission device, the blockchain-based data transmission device configured to:

detect a request for a specific server from a client device;

select two or more first nodes, via which the client device delivers the request to the specific server, as a request relay node;

select two or more second nodes, via which the specific server delivers a response to the request to the client device, as a response relay node;

deliver the request of the client device to the specific server via the selected request relay node; and deliver the response of the specific server to the request to the client device via the selected response relay node, wherein each node acting as the request relay node and the response relay node belongs to a group classified for each predetermined category, and wherein the blockchain-based data transmission device is further configured to, in selecting of the two or more first nodes:

select a first node from a group different from a group to which the client device belongs; and when the two or more first nodes are selected, select nodes, which are adjacent to each other, such that the adjacent nodes do not belong to the same group, and wherein the blockchain-based data transmission device is further configured to, in selecting of the two or more second nodes:

select a second node from a group different from a group to which the specific server belongs; and when the two or more second nodes are selected, select nodes, which are adjacent to each other, such that the adjacent nodes do not belong to the same group.

* * * * *